United States Patent
Nichols, Jr.

(10) Patent No.: US 6,705,050 B2
(45) Date of Patent: Mar. 16, 2004

(54) FLASHING DEVICE

(75) Inventor: Charles E. Nichols, Jr., Raytown, MO (US)

(73) Assignee: Building Materials Investment Corporation, Wilmington, DE (US)

( * ) Notice: Subject to any disclaimer, the term of this patent is extended or adjusted under 35 U.S.C. 154(b) by 54 days.

(21) Appl. No.: 10/035,626

(22) Filed: Nov. 9, 2001

(65) Prior Publication Data

US 2003/0089047 A1 May 15, 2003

(51) Int. Cl.[7] .................................................. F16L 5/00
(52) U.S. Cl. ............................................... 52/62; 52/61
(58) Field of Search ........................ 52/62, 61; 285/42, 285/53; 248/56

(56) References Cited

U.S. PATENT DOCUMENTS

| | | | | |
|---|---|---|---|---|
| 700,611 A | * | 5/1902 | Bollinger | 126/314 |
| 1,494,234 A | * | 5/1924 | Gossett | 285/42 |
| 2,474,172 A | * | 6/1949 | Tinnerman | 403/252 |
| 2,574,142 A | * | 11/1951 | Buongirno | 165/77 |
| 4,192,477 A | * | 3/1980 | Decky et al. | 248/56 |
| 5,627,342 A | * | 5/1997 | Kramer | 174/65 G |
| 5,890,923 A | * | 4/1999 | Wright et al. | 439/374 |

* cited by examiner

*Primary Examiner*—Carl D. Friedman
*Assistant Examiner*—Basil Katcheves
(74) *Attorney, Agent, or Firm*—Marilyn J. Maue; William J. Davis; Walter Katz

(57) ABSTRACT

A flashing device for covering a wall mounted service feed line entering or exiting a building which device comprises a flat plate having a central keyhole shaped opening and a downwardly or horizontally extending hollow sleeve member integrally mounted to the eye portion of the keyhole shaped opening on a plane approximately perpendicular to said plate; the underside of said sleeve having a slot horizontally disposed along its entire length, wherein the opposed edges ends of the horizontal slot are contiguous with the bottom eye portion and the top leg portion of the keyhole shaped opening and the width of the slot is commensurate with the width of the service feed line to or from the building.

12 Claims, 1 Drawing Sheet

FLASHING DEVICE

FIELD OF THE INVENTION

The invention relates to a flashing device which prevents deterioration of an aperture or aperture mounting surrounding a service feed line entering or exiting a vertical wall or roof curb of a building.

BACKGROUND OF THE INVENTION

Heretofore service to or from a building has been made accessible by a feed line or pipe penetrating a hole drilled through a wall of the structure. Generally, the pipe is immovably fixed in place by cementing it in the hole.

Accordingly it is an object of this invention to overcome the above problems by providing a unique device which eliminates exposure to moisture and UV radiation at the point of service entry or exit to or from a building. Another object is to provide an economical and commercially feasible solution to the above problem. These and other objects and benefits of the present device will become apparent from the following description and disclosure.

SUMMARY OF THE INVENTION

This invention concerns flashing device adapted for covering a service feed line to or from a building and optionally any mounting which secures the feed line in place, which device comprises (i) a substantially flat plate member suitable for attachment to a surface of the wall over the service feed line and any mounting associated therewith, said plate member having a centrally located keyhole shaped opening with the upper eye portion positioned above the leg portion of the keyhole and (ii) a downwardly or horizontally extending hollow sleeve integrally mounted through the eye portion of the keyhole opening which sleeve essentially contains a slot or opening running along the entire length of its underside portion, the opposed upper ends of said slot or opening being convergent with the bottom eye portion and the top leg portion of the keyhole, said sleeve and slot being adapted to receive a service line, e.g. a gas or fuel line, electrical wiring a building vent or duct or other service means requiring penetration of an exposed vertical structure of a building.

DETAILED DESCRIPTION OF THE INVENTION

The flashing device of this invention is a round, square or rectangular member preferably composed of metal, e.g. aluminum or steel, which is conveniently attached to the wall surface by nailing at a plurality of sites; however flashing devices, composed of a weather resistant high density plastic or atactic polypropylene, are also contemplated for use in this invention. The metal flashing devices can be modified by having an outer peripheral margin of atactic polypropylene so that attachment can be accomplished by torching the device to the wall. Also, the device may be attached by means of plate rim to wall coating of weather resistant adhesive.

The preferred diameter of the sleeve including the slot space running the entire length of the sleeve is at least approximately equal to that of the service conduit entering or leaving the building and is sufficient to provide a snug fit around the circumference of the conduit. However, sleeve openings of wider diameter are also within the scope of the invention.

To provide suitable protection against weathering, the sleeve of the flashing device is extended from the exposed surface of the plate by a distance sufficient to allow drainage of any moisture which may accumulate therein. By way of illustration, for example, a 12×12 inch plate, the sleeve is preferably extended at least 7 inches. The sleeve can also extend from the opposite, unexposed side of the plate, through the wall to provide added support for the service line.

The plate has a thickness to assure rigidity, preferably 23–30 gauge metal and can be of any configuration suitable for covering the access hole and/or service mounting in the wall; however, substantially square or rectangular plates are suitable for most applications. It will be understood that the present flashing device can vary widely in many shapes and sizes commensurate with the dimensions of the conduit access hole and service required, e.g. conduit, gas line, drainage line, duct work and the like.

Other modifications also contemplated within the scope of this invention include a plate having a slightly thicker central area around the keyhole opening to promote drainage and/or a sleeve having one or more internal whiskers directed to the sleeve outlet end to direct moisture away from the mounting of the conduit.

A main advantage of the present invention is that the present flashing device can be applied to buildings, which have existing wall mounted service lines without dismantling the existing installation. Other benefits and advantages will become apparent from this disclosure.

Having generally described the invention, reference is had to the accompanying figures of the drawing which illustrates the most preferred embodiments but are not to be construed as limiting to the scope of the invention as defined above and in the appended claims.

IN THE DRAWING

Figure 1:
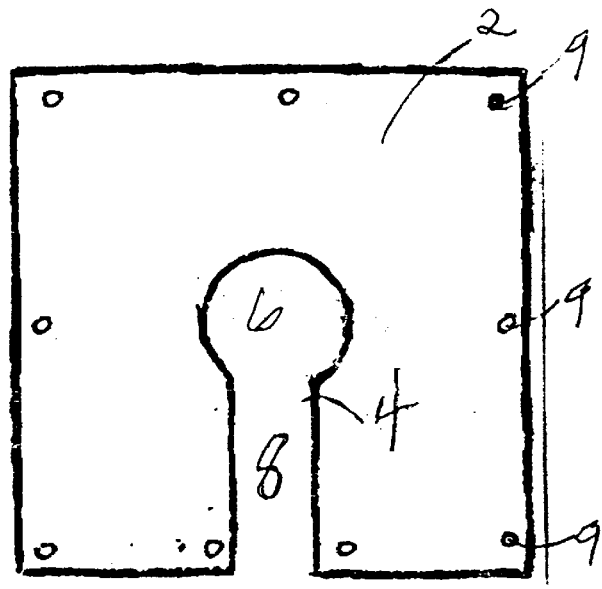
FIG. 1 is a frontal view of the plate absent the sleeve.

In FIG. 1, substantially square, wall mountable 12×12 inch plate member 2 having apertures 9 at its free edges adapted for nailing the plate to a vertical cement wall over an service access hole, shows centrally located keyhole opening 4 having upper eye portion 6 and lower leg portion 8.

Figure 2:
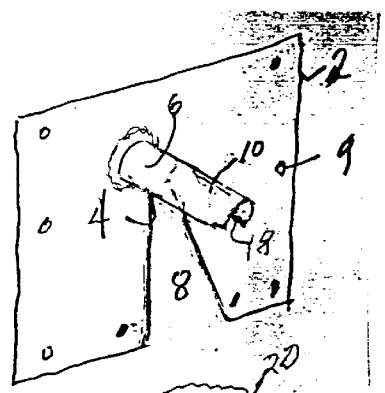
FIG. 2 is a front perspective view and represents the plate with the downwardly extending sleeve.

FIG. 2 illustrates plate member 2 having sleeve 10 of 4 inch diameter integrally mounted through eye portion 6 and directed in a downward extending position for maximum drainage.

Figure 3:
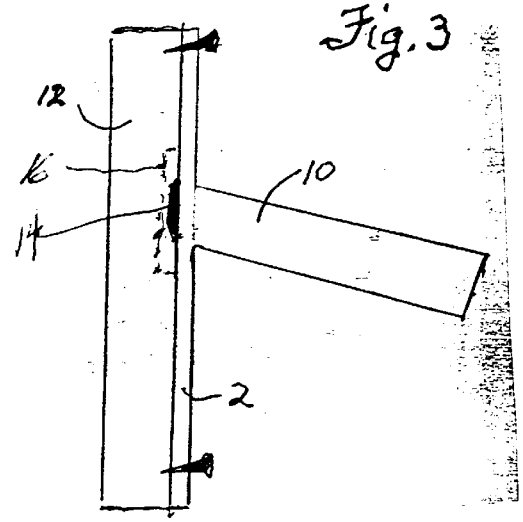
FIG. 3 is a side view of the plate and sleeve combination.

FIG. 3 shows a side view of the flashing device attached to the outer surface of vertical wall 12 of about 10 inch thickness. In this illustration flashing device has a thickness of about ⅛ inch and is sealably attached to wall 12 over access hole 14 and cement mounting 16.

Figure 4:
FIG. 4 is a frontal perspective view of the present sleeve.

FIG. 4 is a front perspective view of sleeve 10 having slot 18 and collar 20 which is welded to eye portion 6 of plate 2.

What is claimed is:

1. A flashing device comprising:

(i) a substantially flat plate member suitable for attachment to the surface of the wall of a building over a service line access through said wall, said plate member having a centrally located keyhole shaped opening at its center with the comprising an upper eye portion positioned above the leg portion of the keyhole shaped opening and (ii) a downwardly or horizontally extending hollow sleeve integrally mounted to the eye portion of the keyhole opening which sleeve essentially contains a slot or opening extending the entire length of its under portion, the opposed upper side portions of said slot being convergent with the bottom of the eye portion and top of the leg portion of the keyhole shaped opening, said sleeve adapted to receive said service line, and wherein at least a portion of the edges of said plate is coated with a fusible plastic.

2. The flashing device of claim 1 wherein the plate of said device is mounted over an access hole in said wall adapted to admit a service line to said building and wherein the eye portion of the keyhole opening of the plate is aligned with said access hole.

3. The flashing device of claim 1 wherein the service line is fixedly mounted in a hole through the wall by cementing it in place and wherein the plate of said device covers said cemented mounting and said service line.

4. The flashing device of claim 1 wherein said device is nailed to the wall through a plurality of apertures in said plate.

5. The flashing device of claim 4 wherein at least a portion of the free edges of said plate is coated with a fusible plastic and the plastic is torched after nailing the plate to the wall to provide a waterproof seal of said device to said wall.

6. The flashing device of claim 5 wherein a bottom free edge portion of said plate is coated with said plastic.

7. The flashing device of claim 1 wherein the plate is composed of metal.

8. The flashing device of one of claims 1, 2 or 3 wherein said sleeve is composed of metal.

9. The flashing device of claim 1 wherein said sleeve extends from both sides of said plate and through the hole in said wall.

10. The flashing device of claim 1 wherein said sleeve extends at least 3 inches from the surface of said plate.

11. The flashing device of claim 1 wherein the plate has a greater thickness in the area around the keyhole to promote drainage.

12. The flashing device of claim 1 wherein said sleeve contains at least one channel on its inner surface adapted to direct moisture to its outlet and away from the mounting of the flashing device.

* * * * *